United States Patent
de Wergifosse (10) Patent No.: US 9,752,704 B2
(45) Date of Patent: Sep. 5, 2017

(54) VALVE FOR CONTROLLING HEAT EXCHANGES IN AN OIL CIRCUIT

(71) Applicant: SNECMA, Paris (FR)

(72) Inventor: Huguette de Wergifosse, Moissy-Cramayel (FR)

(73) Assignee: SNECMA, Paris (FR)

( * ) Notice: Subject to any disclaimer, the term of this patent is extended or adjusted under 35 U.S.C. 154(b) by 536 days.

(21) Appl. No.: 13/938,925

(22) Filed: Jul. 10, 2013

(65) Prior Publication Data
US 2014/0014198 A1 Jan. 16, 2014

(30) Foreign Application Priority Data
Jul. 11, 2012 (FR) ...................... 12 56663

(51) Int. Cl.
*F01P 3/20* (2006.01)
*F01P 7/16* (2006.01)
(Continued)

(52) U.S. Cl.
CPC ............... *F16K 49/00* (2013.01); *F02C 7/06* (2013.01); *F02C 7/224* (2013.01); *G05D 23/1393* (2013.01); *G05D 23/1925* (2013.01); *F05D 2260/606* (2013.01); *F05D 2260/98* (2013.01); *F05D 2270/303* (2013.01); *F05D 2270/3062* (2013.01); *F05D 2270/56* (2013.01); *Y02T 50/671* (2013.01); *Y10T 137/6579* (2015.04)

(58) Field of Classification Search
CPC ............... F01P 2025/32; F01P 2025/40; F01P 2060/04; F01P 2007/146; F01P 7/167
USPC ......................... 137/340, 334, 339
See application file for complete search history.

(56) References Cited

U.S. PATENT DOCUMENTS 2,070,091 A * 2/1937 Nutt ................... F01P 7/16
123/196 AB
4,696,156 A * 9/1987 Burr ..................... F01D 25/18
60/39.08
(Continued)

FOREIGN PATENT DOCUMENTS

FR 2 951 228 4/2011
FR 2951228 A1 * 4/2011 ............... F02C 7/06
(Continued)

OTHER PUBLICATIONS

Search Report and Written Opinion as issued for French Patent Application No. 1256663, dated Apr. 19, 2013.

*Primary Examiner* — Frantz Jules
*Assistant Examiner* — Meraj A Shaikh
(74) *Attorney, Agent, or Firm* — Pillsbury Winthrop Shaw Pittman LLP (57) ABSTRACT

A valve for regulating the temperature of an oil flow, includes a first inlet channel, a second inlet channel and an outlet channel, the second inlet channel and the outlet channel being capable of cooperating with a temperature regulator. One of the inlet channels includes an oil flow regulator controlled by a computer by generation of an electrical set value respecting a control law configured within the computer, the control law being slaved by an oil flow temperature sensor, the electrical set value controlling opening and closing of the regulator, the regulation law generating an alternation of open and closed states of the flow regulator so as to achieve a required average temperature of the oil flow over a given period.

10 Claims, 7 Drawing Sheets

(51) Int. Cl.
*F01P 5/14* (2006.01)
*F16K 49/00* (2006.01)
*F02C 7/06* (2006.01)
*F02C 7/224* (2006.01)
*G05D 23/13* (2006.01)
*G05D 23/19* (2006.01)

(56) References Cited

U.S. PATENT DOCUMENTS

| | | | | |
|---|---|---|---|---|
| 5,657,722 | A * | 8/1997 | Hollis | F01P 7/167 123/41.08 |
| 6,427,640 | B1 * | 8/2002 | Hickey | F01M 5/007 123/41.31 |
| 7,398,745 | B1 * | 7/2008 | White | F01P 5/14 123/41.01 |
| 8,333,068 | B2 * | 12/2012 | Muramatsu | F01N 3/0205 60/320 |
| 2002/0112679 | A1 * | 8/2002 | Langervik | F01P 3/20 123/41.33 |
| 2002/0112902 | A1 * | 8/2002 | Wakashiro | B60K 6/485 180/65.26 |
| 2003/0172883 | A1 * | 9/2003 | Shiozaki | F01P 7/042 123/41.12 |
| 2003/0196613 | A1 * | 10/2003 | Tomasseli | F01P 7/167 123/41.31 |
| 2007/0137217 | A1 | 6/2007 | Alexander | |
| 2010/0183993 | A1 * | 7/2010 | McAlister | F02M 57/005 431/254 |

FOREIGN PATENT DOCUMENTS

| | | | | |
|---|---|---|---|---|
| FR | 2 969 701 | | 6/2012 | |
| FR | 2969701 | A1 * | 6/2012 | F02C 7/224 |
| GB | 1 069 677 | | 5/1967 | |

* cited by examiner

VALVE FOR CONTROLLING HEAT EXCHANGES IN AN OIL CIRCUIT

CROSS-REFERENCE TO RELATED APPLICATIONS

This application claims priority to French Patent Application No. 1256663 filed Jul. 11, 2012. The content of this application is incorporated herein by reference in its entirety.

FIELD

The technical field of the invention relates to actuator devices such as valves used for controlling the temperature of oil circuits. More particularly, the technical field relates to the recovery of heat energy particularly in oil/air and oil/fuel exchangers in aircraft engines so as to optimise energy savings and reduce fuel consumption.

BACKGROUND

At the present time, attempts are being made to recover heat energy from fuel immediately before combustion, in order to improve heat energy recovery from the different air, oil and fuel circuits. The calorific value of the fuel at injectors is high and forms an energy reserve that can be used in other circuits.

The maximum fuel temperature limit is usually fixed to satisfy safety requirements, and has to be modified in order to optimise recovery of heat from fuel. Therefore, heat exchangers have to be controlled and the temperature of the fuel in the tank has to be monitored before it is injected into the combustion chamber.

When an oil/fuel exchanger is located before the combustion chamber, heat exchanges between the engine lubrication oil circuit and the fuel regulation circuit are used to recover energy from the fuel if the temperature exceeds the maximum temperature while keeping the fuel at its temperature in the combustion chamber. This energy recovery helps to adjust the oil temperature to optimise energy exchanges with the fuel.

On the other hand, this operation is possible if the calorific value of oil is sufficient to absorb a certain quantity of heat. Existing architectures then comprise an air/oil exchanger to control temperatures in the oil circuit. This control facilitates heat exchanges with the fuel by controlling the oil temperature. Consequently, exchanges between the lubrication oil circuit and the fuel regulation circuit will be facilitated by minimising heat exchanges between the oil circuit and the air circuit while respecting maximum allowable temperatures in the oil and fuel circuit.

A device for performing this function to control the thermal power evacuated from the oil circuit to the air circuit through an oil/air exchanger, also called ACOC, and therefore to control the thermal power evacuated to the fuel circuit through the main oil/fuel exchanger called the MHX, is to include a temperature control valve. This type of valve is usually called an FTC (Fuel Temperature Control) valve.

At the present time, one solution is to use such a valve comprising a first channel without an exchanger that can be regulated in flow and a second channel with an oil/air exchanger to modulate the temperature of the incoming flow into this second channel. The flow in each channel can be modulated by a flow regulation device such as a slide.

However, the conventional configuration of the FTC valve is complex because it is based on a principle of modulating the opening sections of each channel while keeping a constant total flow and controlling the flow distribution by a computer. The slide includes two inlets that must be adjusted to the valve inlets.

Figure 1:
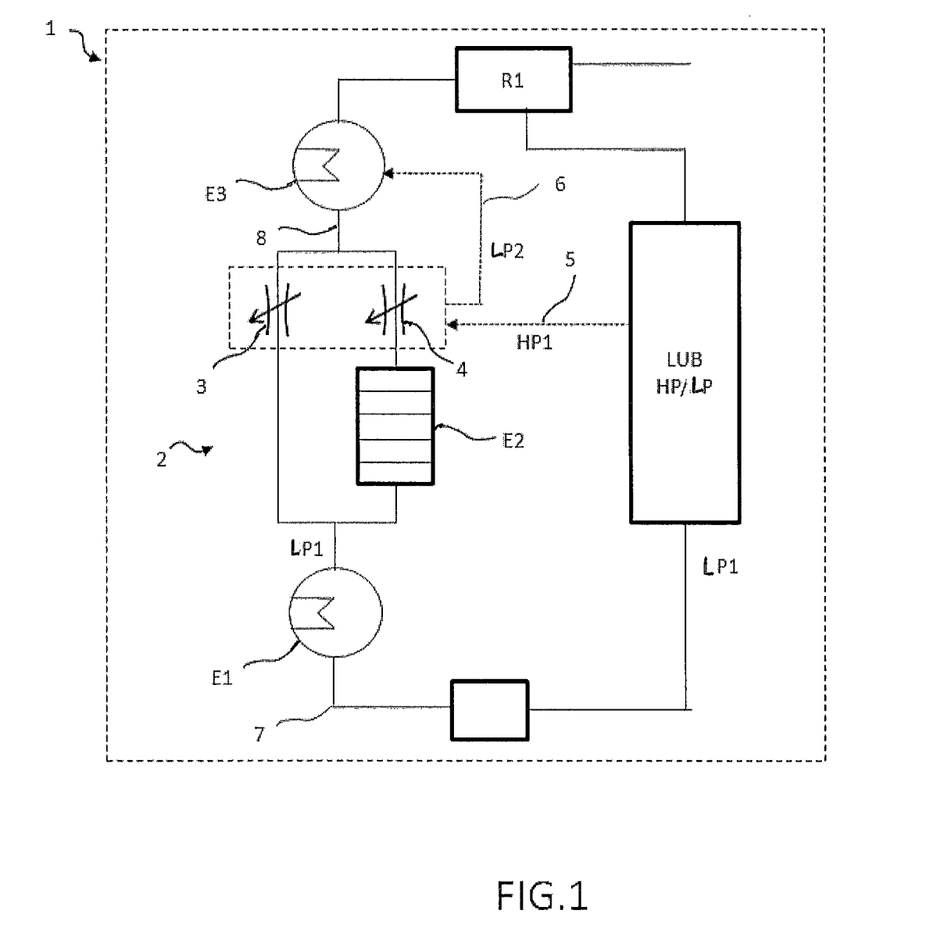
FIG. 1 represents a heat exchange system according to the prior art in the different oil/air fuel circuits for controlling the fuel temperature of an aircraft.

FIG. 1 shows a currently used FTC valve in which a lubrication oil circuit is supplied by a lubrication element HP/LP LUB that comprises at least one high pressure circuit and one low pressure circuit. In general, the lubrication element comprises a set of pumps, for example geared pumps, filters and a distribution network comprising connections to equipment in an engine architecture, for example for an aircraft.

In the example shown in FIG. 1, the lubrication element HP/LP LUB comprises a low pressure outlet LP1 that transfers an oil flow in an exchanger E1 that usually maintains a minimum oil temperature. The purpose of this exchanger is to heat the oil flow passing through it. The oil flow heated to at least a minimum temperature is then transferred to an FTC type valve 2. A first flow fraction passes through a first channel comprising an ACOC type exchanger E2, in other words an air/oil exchanger and a first flow regulator 4. A second flow fraction passes through a second channel comprising a second flow regulator 3.

The valve 2 comprises two independent oil circuits:

a first control oil circuit 5, 6 comprising high pressure HP1 and low pressure LP2 oil exchanges; this oil circuit comprises two sub-networks independent of each other; one high pressure sub-network and one low pressure sub-network.

a second heat transfer oil circuit 7, the heat transfer oil circuit being derived from recoveries used for air/oil heat exchanges in exchangers E1, E2. This circuit is usually a low pressure circuit LP1.

The oil flow at the outlet 8 from the valve is then transferred to an oil/fuel exchanger E3 to guarantee a given required fuel temperature within a fuel tank R1.

The lubrication element HP/LP LUB controls the control oil circuit particularly through the inlets/outlets to the FTC type valve 2 or the tank R1.

The assembly 1 forms a calorific value exchanger unit to recover energy through calorific value, particularly by controlling the different heat exchanges in the air/oil and oil/fuel exchangers.

Figure 2:
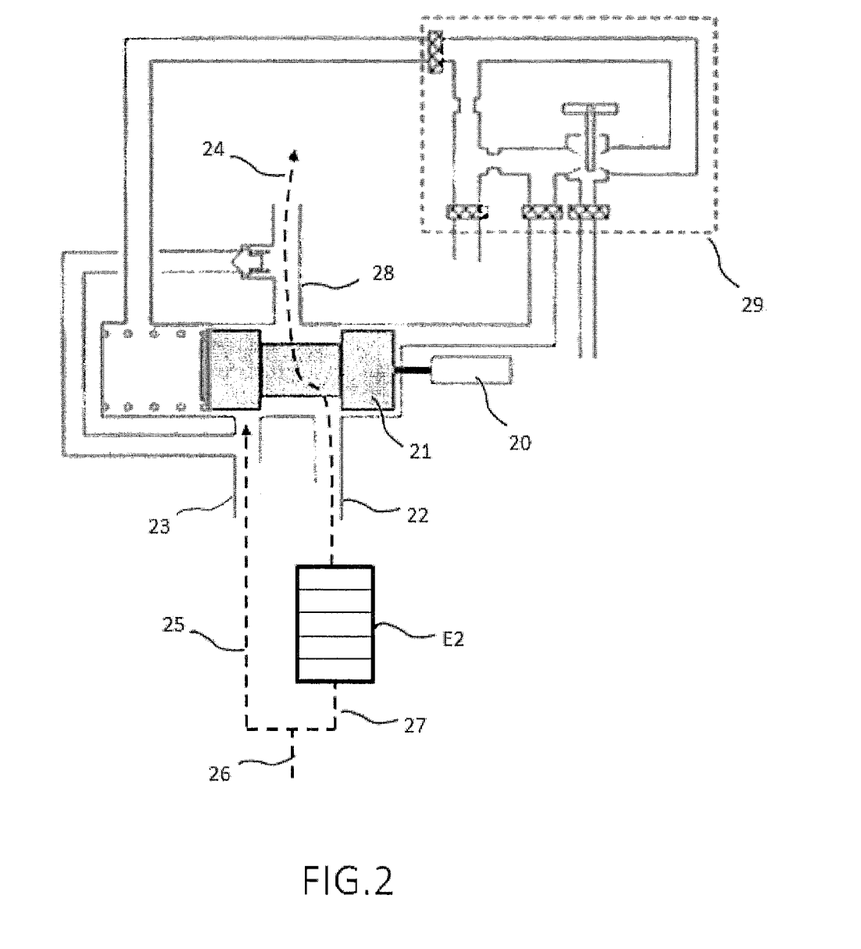
FIG. 2 represents a type of valve for regulation of the oil temperature penetrating into an oil/fuel exchanger according to the prior art.

FIG. 2 shows an example of existing FTC valve solutions to guarantee a constant outlet flow 24 from the valve 2 starting from an inlet flow 26 distributed at the two inlets 22, 23 to the valve in a first flow 25 in which there is no heat transfer and a second flow 27 entering an oil/air exchanger E2.

One particular feature of this solution is that it requires an expensive current controlled servo-valve and that it outputs a control pressure to a slide 21 to control its position.

The slide 21 comprises two inlets 23, 22 and one outlet 28 that transfers the outlet flow 24 to an oil/fuel exchanger not shown in this figure.

This solution also requires an LVDT type position sensor for slaving the slide position. The position of the slide controls the fraction of the flow 25 and the flow 27 that are mixed in the outlet flow 24. The distribution of the flows 26 and 27 controls the oil flow temperature towards the oil/fuel exchanger.

It is desirable that the slide control pressure be proportional to the required opening section in one of the two channels to distribute the flow fraction that will be or will not be heated.

This valve solution has major disadvantages due to the integration of complex and expensive elements such as the servo-valve, the matched slide and the position sensor.

The servo-valve used as the section regulation device for controlling the flow and the matched slide are also elements considered to be sensitive to pollution and have poor resistance to fire.

The principle of controlling heat exchanges by distribution of flows requires the implementation of a proportional control servo-valve and a position sensor for looping in position. This requires a complex, sensitive and expensive architecture, while oil temperature control requirements at the valve outlet can tolerate some inertia in its slaving reactions.

SUMMARY

An embodiment of the invention solves the above mentioned drawbacks.

An embodiment of the invention is a valve for regulating the temperature of an oil flow forming a first oil circuit, the valve comprising a first inlet channel and a second inlet channel and an outlet channel, the second inlet channel and the outlet channel being capable of cooperating with a temperature regulator that varies the temperature of the oil flow entering into the second channel and transferred through the outlet channel.

Depending on the modes of an embodiment of the invention, one of the inlet channels comprises an oil flow regulator controlling the oil flow passing through the channel, the channel being called the regulation channel. The regulator then passes through the channel.

In another mode, the regulation channel does not contain the regulator but is arranged to be compatible with an external regulator connected to the channel.

The flow regulator or the regulation channel is controlled by a computer by generation of an electrical set value respecting a control law configured within the computer, the control law being slaved by an oil flow temperature sensor, the temperature sensor being located at a first position in the environment of the valve, the electrical set value controlling the opening and closing of the regulator.

The regulation law generates an alternation of open and closed states of the regulation channel so as to achieve a required average temperature of the oil flow at a point on the downstream side of the outlet from the valve, over a given period.

A benefit of an embodiment of the invention is that a simple control law can be configured to bring the temperature at which oil penetrates into an oil/fuel exchanger to a required value. Control is simplified because the flow regulator interfaces with only one channel of the valve and enables so-called "all or nothing" operation.

The valve is easier to make and easier to repair and parts are more easily interchangeable. In particular, elimination of a slide comprising a position sensor simplifies the mechanical design of the architecture.

Beneficially, the oil temperature regulator is an air/oil temperature exchanger.

A benefit is that such an exchanger can easily be configured at the second channel. Either a connection to an exchanger may be made, or the exchanger may be integrated into the valve according to the invention.

Beneficially, the oil flow regulator is located on the second channel, the second channel directly transferring the inlet flow entering the second channel towards the valve outlet when the flow regulator is in the open position.

A benefit is that each channel of the valve can be functionally dissociated. One channel comprises the flow regulator and the other channel comprises the temperature regulator. This architecture is simple for maintenance and association of elements with each other is less mechanically constraining.

Beneficially, the flow regulator is a solenoid valve controlling a second high and low pressure oil circuit for controlling the position of a valve opening or closing actuator depending on an electrical set value, the position of the actuator closing off or bypassing the oil in the first circuit.

A benefit is that the solenoid valve is a simple component, less expensive and less complex than a servo-valve.

Beneficially, the high pressure oil in the second circuit is independent of the oil in the first circuit and the low pressure oil in the second circuit is drawn off from the same source as the oil in the second circuit.

A benefit is that a circuit already connected to the valve can be used. A simple parallel channel can be routed as far as the valve flow regulator control device.

Beneficially, alternation of open and closed states is configured to define a cyclic ratio defining:

a first ratio ($R_1$) between the open duration ($D_O$) and the closed duration ($D_F$) observed consecutively and;

a second ratio ($R_2$) between a number of alternations (N) and a first period ($T_1$).

A benefit is that parameters are easy to implement in a computer control algorithm. Such a law is configured simply by applying an alternating current at durations that can be predetermined for different temperatures using a memory containing a correspondence table between target temperatures and predefined ratios.

Beneficially the computer comprises a correspondence table between a required temperature recorded at the temperature sensor and values of the first and second ratios.

Beneficially, the temperature sensor is arranged at the valve outlet.

This configuration enables a precise temperature record with good measurement speed. The temperature record is also accurate representing the real outlet temperature.

An alternative is to record the temperature after the outlet to take account of the mix of oils originating from the two channels alternately.

Beneficially, the temperature sensor is arranged at the inlet to an oil/fuel exchanger, the oil fuel exchanger being located downstream from the valve outlet.

Beneficially, the entire flow entering into the two inlet channels is transferred to the valve outlet so that the inlet flow is approximately equal to the valve outlet flow.

BRIEF DESCRIPTION OF THE FIGURES

Other characteristics and benefits of the invention will become clear after reading the detailed description given below with reference to the appended figures that show.

DETAILED DESCRIPTION

A valve "bypass mode" refers to a mode that directly transfers a liquid flow entering into a valve inlet to an outlet from the valve through a channel without a heat exchanger. The channel is said to be "bypassing".

Figure 3:
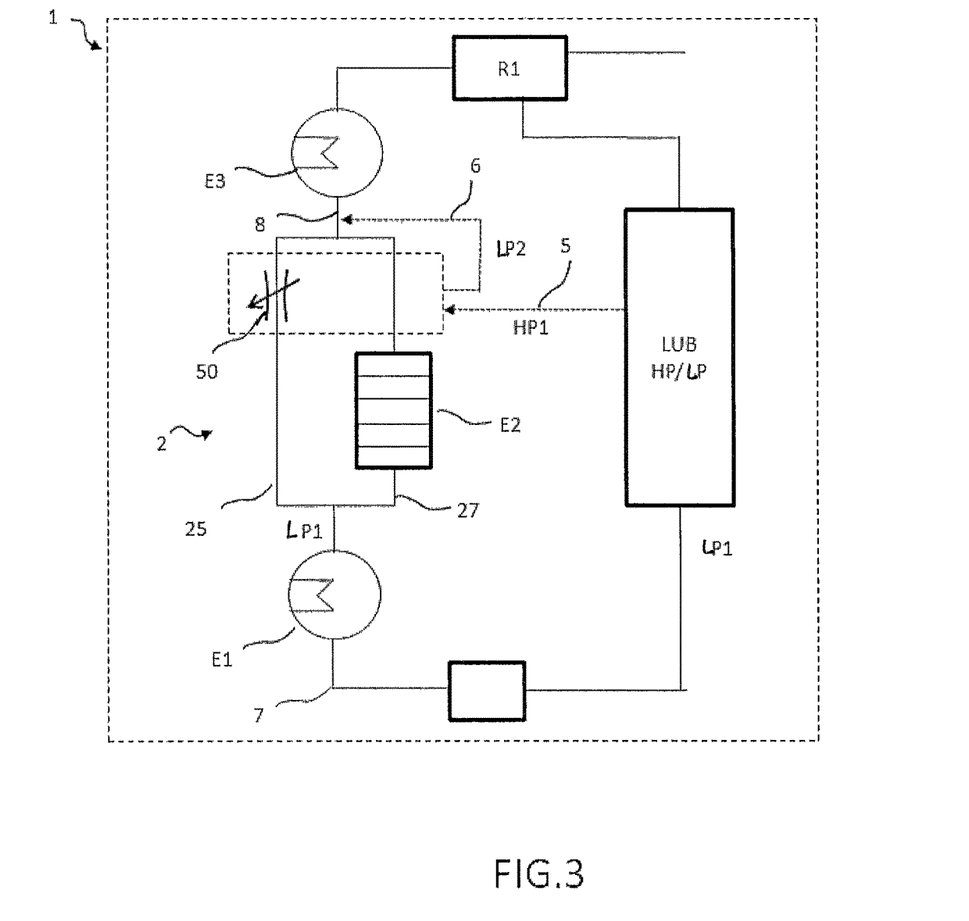
FIG. 3 represents a heat exchange system using a valve according to an embodiment of the invention.

FIG. 3 shows a heat exchange system 1 of an oil circuit with air and fuel circuits in an aircraft engine.

The system comprises a valve 2 for regulating the temperature of an oil flow 7 from a lubrication system HP/LP LUB outputting a low pressure flow LP1. The valve 2 comprises two channels, a first channel 25 and a second channel 27. One of these two channels comprises an oil/air exchanger E2 for exchanging heat between an airflow and an oil flow.

The valve 2 comprises an oil flow regulator 50 arranged on one of the two inlet channels of the valve 2. Each of the inlet channels in the valve is capable of receiving an oil flow from the LP1 flow output by the lubrication element HP/LP LUB.

In the example in FIG. 3, the regulator 50 is arranged on the first channel 25, and the exchanger E2 is arranged on the second channel 27.

One special feature of an embodiment of the invention is that the oil fraction of the upstream flow LP1 entering into the first channel 25 is either transferred to the outlet 8 of the valve or is blocked at the regulator 50. When the channel 25 is blocked by the regulator 50, oil LP1 originating from the lubrication element HP/LP LUB is transferred to the second channel comprising the exchanger E2. The exchanger E2 exchanges heat with oil transferred to the outlet 8.

The outlet oil flow 8 from valve 2 is transferred to a fuel/oil exchanger E3 to maintain the fuel temperature in the tank R1.

A control oil circuit HP1 and LP2 actuates a solenoid valve of the regulator 50 of valve 2 to control the open or closed state of the first channel. Control may be done using actuators like those described in one of the following embodiments. The control channels 5, 6 draw off oil flows HP1 and LP2 for high and low pressure control respectively from the lubrication element HP/LP LUB.

Therefore, the valve according to an embodiment of the invention enables "all or nothing" type operation in each of its channels to alternate the output between two outlet oil flows at different temperatures so as to obtain a required average temperature at the exchanger 3 over a given time interval.

Figure 4:
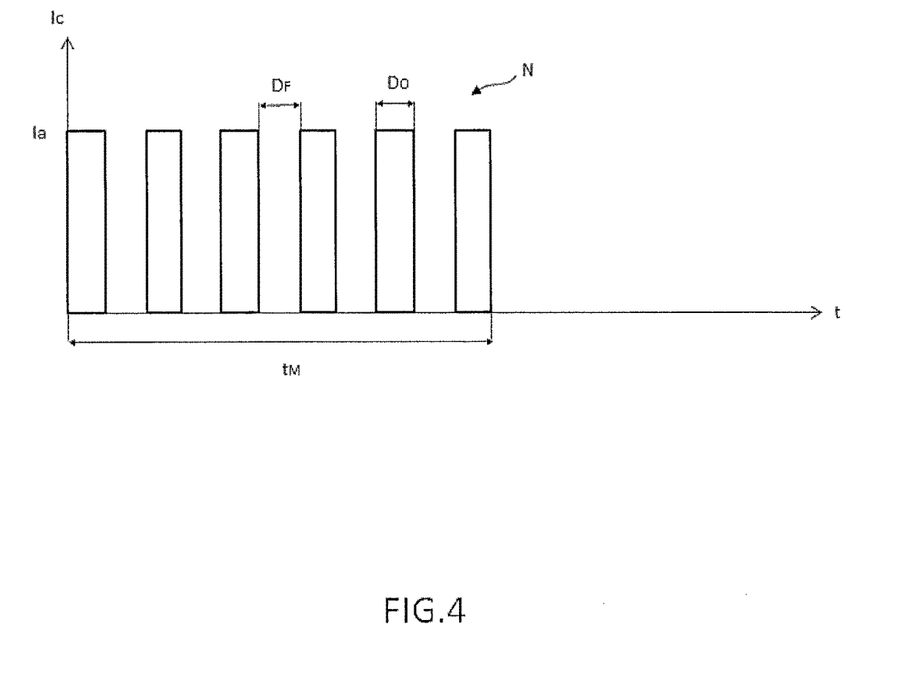
FIG. 4 represents an example of a solenoid valve open and close control law according to an embodiment of the invention.

FIG. 4 shows an example regulation law that may be controlled using a computer configured to control the regulator 50 and the open and/or closed states of the first channel 25 so as to block or bypass the LP1 oil flow. The computer may control the regulator 50 using machine executable instructions or codes. These machine executable instructions may be embedded in a data storage medium of the computer or another processor module.

A so-called "all or nothing" regulation law means that when a channel is blocked, the entire flow entering into the low pressure LP1 flow channel 7 is transferred to the second channel 27 of valve 2, in other words the channel without the regulator 50 in the case of the example in FIG. 3. In the example in FIG. 3, it is the channel in which the air/oil exchanger E2 is located.

In another embodiment, the regulator 50 may be located in the second channel comprising the exchanger 50, all or nothing operation also being achieved in this configuration.

The regulation law in FIG. 4 shows a possible embodiment of the invention.

A "step" type function may be used to enable "all or nothing" functioning in one of the channels of the valve, to define:
a null control current "Ic" when the first channel is passing and,
a non-null control current "Ia" to activate a first actuator of a solenoid valve, for example to block off the flow LP1 passing through the first channel 25.

When the first channel is blocking for the flow LP1, the flow LP1 flow passes entirely through the second channel 27.

Beneficially, the current is defined as oscillating current alternating between a non-null current denoted "Ia" and a null current for durations of $D_F$ and $D_O$ respectively, to configure an appropriate regulation law. Duration Do corresponds to the opening time and DF corresponds to the closing time of the channel. Opening and closing is done by actuators that may comprise at least one valve or at least one piston.

The ratio between these two durations $D_F/D_O$ can define an average oil temperature at the valve outlet. The oil flow passing through the first channel 25 for a duration Do at a temperature $T_1$ and the oil flow passing through the second channel 27 for a duration $D_F$ at a temperature $T_2$ can give an oil volume with an average duration $T_M$ at a required temperature $T_{FIN}$.

The regulation law also comprises the definition of a number N of alternations within a predefined duration $t_M$. The ratio $N/t_M$ defines a sequence to create mixing at the required temperature $T_{FIN}$ at a point at the valve outlet.

A temperature sensor records the temperature $T_{cap}$ at the valve outlet and a computer is used to control a control law to define a new average required temperature $T_{FIN}$.

The control law may be adjusted so as to minimise the difference DIF=$\{T_{cap}-T_{FIN}\}$ by correction of the durations $D_O$ and $D_F$.

The oil temperature $T_{cap}$ at the valve outlet 8 recorded by the sensor may be controlled so as to satisfy a required heat exchange in the oil/fuel exchanger E3.

In other embodiments of the invention, the temperature sensor can be arranged in the heat exchange system 1 at locations other than the outlet 8 from the valve 2 so to control the oil temperature at the outlet from the valve E2. For example, the fuel temperature in the tank R1 may be a reference knowing the heat exchange between the oil and the fuel. The benefit of choosing the outlet from valve 2 for positioning the sensor is that a reliable, fast and fairly precise measurement can be obtained.

Based on the so-called "all or nothing" control law that controls opening and closing of the flow regulator 50 of the valve 2 according to an embodiment the invention, the temperature of the heat exchange system 1 is regulated by the adjustment of average flows obtained by open/close time cycles of at least one actuator.

The oil/air exchanger E2 located in one of the channels of valve 2, particularly the second channel 27 in FIG. 3, modifies the temperature of an oil flow passing through it and transferred to the outlet 8 from valve 2 during time periods alternating with time periods during which the inlet oil flow passes through the valve 2 through the first channel 25 at an unchanged temperature. The average oil flow considered over a duration during which several alternations have been made gives an average temperature of an oil mix.

Since the heat dynamics depends on inertia, the thermal constant is therefore compatible with functioning based on average durations and averaged thermal powers.

The temperature slaving loop comprises a suitable corrector that governs cyclic ratios controlling opening/closing of elements in "all or nothing" to obtain average flows.

This average flow control solution simplifies the architecture of an FTC valve, particularly concerning the channel parallel to the channel comprising the exchanger E2 that comprises a regulator with a single inlet and a single outlet and that is easy to install.

Figure 5:
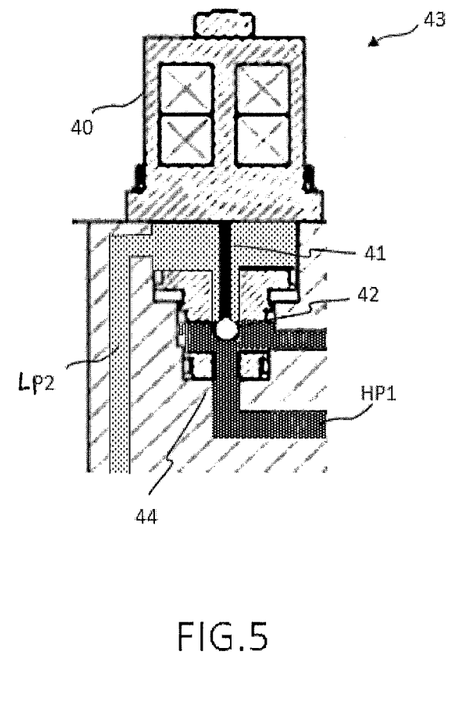
FIG. 5 represents a valve control device according to an embodiment of the invention.

FIG. 5 shows a control element 43 of a first actuator 41, 42 of the regulator 50 that controls two control oil circuits from the lubrication element HP/LP LUB. Opening and closing the first channel 25 of the valve causes a pressure differential between the oil in each of the control oil circuits.

In this case, a solenoid valve 40 such as an electro-valve may be used to implement the regulation law operating in "all or nothing". A first actuator then comprises a rod 41 and a valve such as a ball 42. In this case, the position of the first actuator is determined from an electrical set value of the solenoid valve that controls the rod, and closes or opens an opening 44 formed by a ring in FIG. 5.

The architecture is simplified by using a low pressure fluid LP2 and a high pressure fluid HP1 to create pressure differentials:
- on each side of the ball to keep the actuator in a default position when there is no output set value and;
- on each side of a second actuator to block the low pressure fluid LP1 to be transferred to the valve outlet.

These fluids consists of a high pressure oil flow HP1 and a low pressure oil flow LP2 drawn off from the lubrication element HP/LP LUB.

One benefit is that this fluid is already present in the energy exchange system. Furthermore, the lubricator HP/LP LUB comprises low pressure LP2 and high pressure HP1 control oil that can easily be used.

In one variant embodiment, the low pressure control oil LP2 can be drawn off from the low pressure oil flow LP1 entering valve 2. This possibility simplifies the architecture particularly so that excessively restrictive isolating means such as seals that are not necessary when low pressure oil is recovered from the main circuit LP1 can be eliminated from the architecture.

In the latter case, the low pressure oils LP1 and LP2 originate from the same circuit.

The valve is slaved by a computer retrieving the temperature values from the temperature sensor at the outlet from valve 2. A temperature sensor is more compact and less expensive than a position sensor. A position sensor may be difficult to implement depending on the slide used, this drawback can be avoided by the use of a temperature sensor coupled to a flow regulator controlled according to a required average temperature.

The temperature sensor is independent of the architecture of the flow regulator 50. In particular, it may be replaced independently of the flow regulator 50 used.

A benefit over the mechanical slide solution coupled with the position sensor is that the regulator 50 only requires one inlet 25. Therefore implementation is easier because installation of a regulator only affects a single channel.

Figure 6:
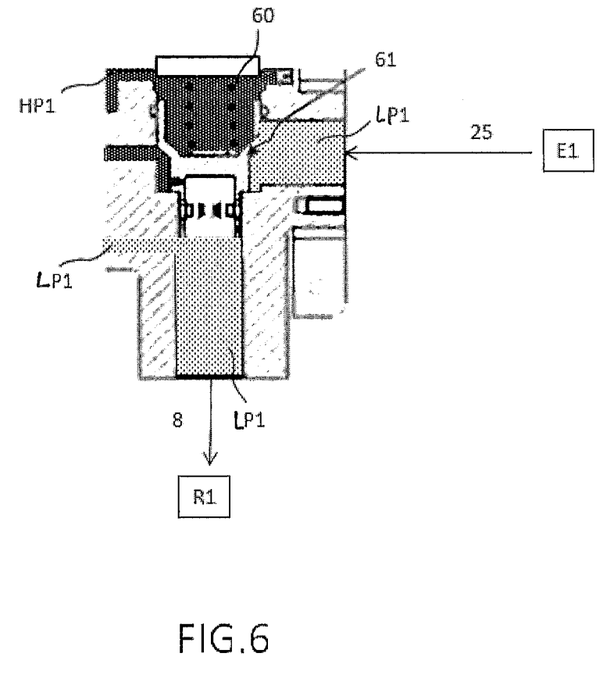
FIG. 6 represents an actuator of a valve according to an embodiment of the invention.

FIG. 6 shows an alternative of the invention that is an improvement over the slide used in solutions according to prior art. A second actuator, for example formed from a piston 61 and a spring 60, enables or does not enable fluid LP1 to circulate in the channel by passing through it or blocking it.

The position of the actuator is determined by the pressure differential between the high pressure fluid HP1 in the control oil circuit and the low pressure fluid LP1 in the main circuit that corresponds to the low pressure oil to be transferred at a certain temperature at the outlet from valve 2.

In an embodiment, the position of the first actuator controls the high pressure fluid HP1 to hold or not hold the second actuator.

When the computer does not generate an electrical set value at the solenoid valve of the regulator 50, the first actuator is not activated and cannot block the return of fluid HP1 so that it holds the second actuator in the position blocking the LP1 flow.

In this case, LP1 oil passes through the valve 2 through the second unblocked channel 27 that includes the exchanger E2. It is said that the second actuator is active because it is blocking. The low pressure oil flow LP1 passing through the valve 2 then passes entirely through the exchanger E2 during this time period during which the second actuator is active.

When an electrical set value is activated to the solenoid valve, the first actuator formed by the rod and the ball are activated. They allow the high pressure fluid HP1 to return, the high pressure fluid no longer retains the second actuator that becomes passive.

Therefore LP1 oil can pass through the second channel 27 to the outlet 8 from the valve 2.

In another embodiment, the electrical set value emitted at the solenoid valve releases the first channel. The channel control can be configured so as to generate an opening current of the first channel or a closing current.

The regulator valve 50 of the valve 2 according to an embodiment of the invention may include a single actuator or a plurality of actuators, depending on the embodiment.

Figure 7:
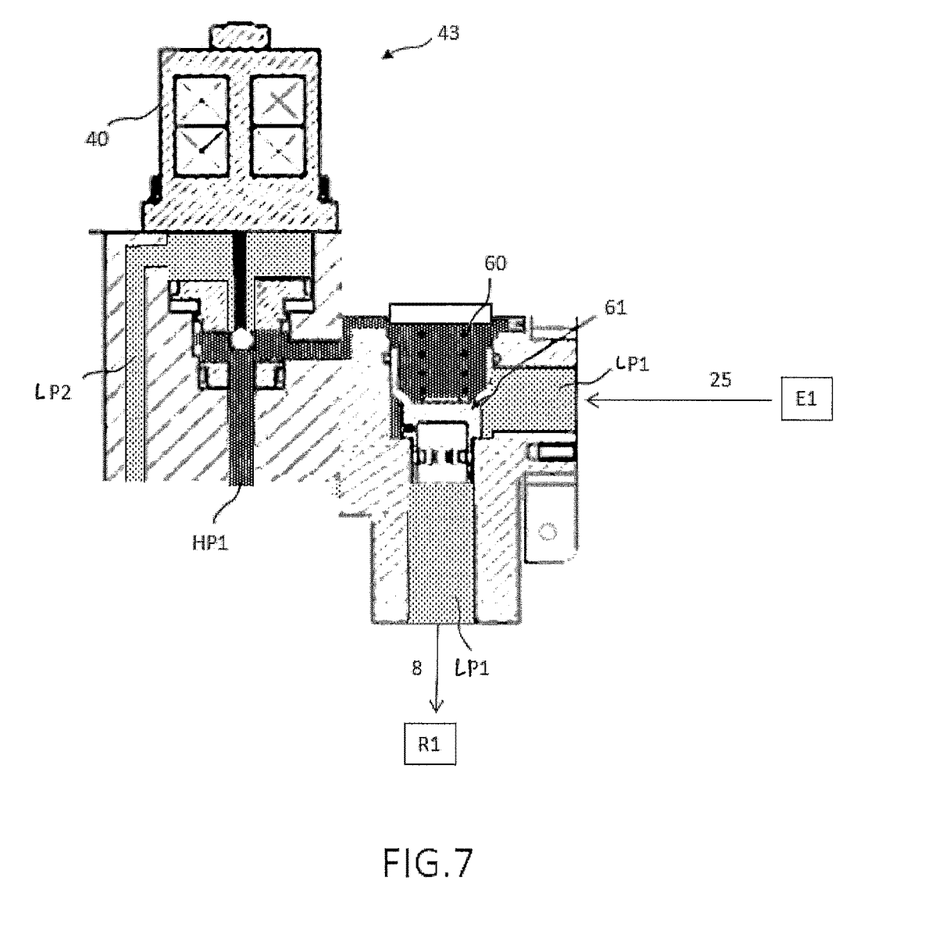
FIG. 7 represents a valve according to an embodiment of the invention.

FIG. 7 shows an embodiment of the valve 2 according to an embodiment of the invention comprising a regulator 50 comprising a control device 43 comprising a servo-valve or solenoid valve 40 coupled to the second LP1 fluid passage channel 25. The solenoid valve 40 is controlled by an electrical set value generated from the computer slaved by a required set temperature value at the outlet 8 from the valve according to an embodiment of the invention and a temperature record $T_{cap}$ from a sensor placed at the outlet from the valve 2.

According to a particular alternative embodiment of the high pressure HP1 and low pressure LP2 control fluid circuits controlling the position of the actuators of regulator 50, the LP1 oil flow to be transferred to the outlet from the valve is used to supply the low pressure control circuit LP2.

The solution according to an embodiment of the invention has many advantages including:
- elimination of the complex servo-valve element sensitive to fire and the use of an element operating in "all or nothing" mode such as a solenoid;
- elimination of the position sensor and use of a simpler temperature sensor;
- elimination of a matched three-way valve for a valve comprising only two channels without matching;
- the possibility of replacing an architecture with two separate independent circuits LP1 and LP2 by an architecture with a single independent LP2 circuit supplied through LP1.

The invention claimed is:

1. A valve for regulating the temperature of an oil flow forming a first oil circuit, the valve comprising:
a first inlet channel, a second inlet channel and an outlet channel, the second inlet channel and the outlet channel being capable of cooperating with an oil temperature regulator that is constructed to vary the temperature of the oil flow entering into the second inlet channel and transferred through the outlet channel, wherein one of the first and second inlet channels comprises an oil flow regulator to regulate the oil flow passing through said one of the first and second inlet channels, said oil flow regulator of said one of the first and second inlet channels being controlled with a computer by generation of an electrical set value obeying a control law configured within the computer, said control law being dependent upon an oil flow temperature sensor that is located at a first position in the environment of said valve, the electrical set value controlling opening or closing of the oil flow regulator, said control law generating an alternation of open and closed states of said one of the first and second inlet channels during a predetermined period of time so that, during said predetermined period of time, the oil flow passes through said one of the first and second inlet channels in the open state and the oil flow passes only through another one of the first and second inlet channels that does not include the oil flow regulator in the closed state, so as to achieve a desired average temperature of the oil flow at a point on the downstream side of the outlet from the valve, each of the open and closed states of the alternation being of a duration that is predetermined based on the desired average temperature to be achieved.

2. The valve according to claim 1, wherein the oil temperature regulator is an air/oil heat exchanger.

3. The valve according to claim 1, wherein the oil flow regulator is located on the first inlet channel, the first inlet channel directly transferring the inlet flow entering said first inlet channel towards the outlet of the valve when the flow regulator is in the open position.

4. The valve according to claim 1, wherein the oil flow regulator comprises a solenoid valve constructed to control a second high and low pressure oil circuit for controlling the position of at least one opening and closing actuator of the valve depending on the electrical set value, the position of the actuator closing off or bypassing the oil in the first circuit.

5. The valve according to claim 4, wherein the high pressure oil in the second circuit is independent of the oil in the first circuit and the low pressure oil in the second circuit is drawn off from the first circuit.

6. The valve according to claim 1, wherein the alternation of open and closed states is configured to define a cyclic ratio defining:
a first ratio between an open duration and a closed duration observed consecutively and;
a second ratio between a number of alternations and a first period.

7. The valve according to claim 6, wherein the computer comprises a correspondence table between a required temperature recorded at the temperature sensor and values of the first and second ratios.

8. The valve according to claim 1, wherein the temperature sensor is arranged downstream from the outlet of valve.

9. The valve according to claim 1, wherein the temperature sensor is arranged at the inlet to an oil/fuel exchanger, the oil fuel exchanger being located downstream from the outlet of the valve.

10. The valve according to claim 1, wherein the entire flow entering into the two inlet channels is transferred to the outlet of valve so that the inlet flow is approximately equal to the valve outlet flow.

* * * * *